United States Patent [19]

Wakai

[11] 4,408,328

[45] Oct. 4, 1983

[54] MICROPROGRAM CONTROL CIRCUIT

[75] Inventor: Yoichi Wakai, Suwa, Japan

[73] Assignee: Kabushiki Kaisha Suwa Seikosha, Tokyo, Japan

[21] Appl. No.: 262,358

[22] Filed: May 11, 1981

[30] Foreign Application Priority Data

May 12, 1980 [JP] Japan ................................ 55-62530
May 12, 1980 [JP] Japan ................................ 55-62532

[51] Int. Cl.³ ............................................ G06F 11/00
[52] U.S. Cl. ..................................... 371/62; 364/200; 371/12
[58] Field of Search ..................... 371/12, 62; 364/200

[56] References Cited

U.S. PATENT DOCUMENTS

| 3,749,897 | 7/1973 | Hirvela | 371/62 |
| 3,795,800 | 3/1974 | Nimmo | 371/62 |
| 4,231,089 | 10/1980 | Lewine et al. | 364/200 |
| 4,321,666 | 3/1982 | Tasar et al. | 364/200 |
| 4,351,050 | 9/1982 | Higashiyama | 371/12 |

OTHER PUBLICATIONS

Carnes et al., Processor Checking, IBM Technical Disclosure Bulletin, vol. 17, No. 11, Apr. 1975, pp. 3188–3189.

Primary Examiner—Charles E. Atkinson
Attorney, Agent, or Firm—Blum, Kaplan, Friedman, Silberman & Beran

[57] ABSTRACT

A microprogram control circuit interrupts high speed clock signals inputted to a processor when a HALT instruction issues from the processor in order to end operation at completion of a program. The clock signal is provided only when a program is in process. Should a program continue beyond a preselected time period without a HALT instruction, a control circuit including a timer detects this condition and interrupts the clock signals to the processor. Either an external signal or an automatic internally generated signal allows the clock signal to again enter the processor, reset the registers and address counter, and restart the program. In an alternative embodiment, abnormal operation causes the program to restart without interrupting the clock signals.

12 Claims, 9 Drawing Figures

MICROPROGRAM CONTROL CIRCUIT

BACKGROUND OF THE INVENTION

This invention relates generally to a processor performing programmed operations in accordance with instructions and data stored in memory and more particularly to a microprogram control circuit for detecting an indefinite state, that is, a runaway condition wherein the processor cannot complete a program of instructions and operates continuously. In many microprogram control circuits of the prior art, microinstructions within a program memory are read from selected addresses and executed in response to trigger signals generated within or externally of the circuit. After the entire program is executed, the output of a clock signal from a clock signal generating circuit, is stopped in response to one particular microinstruction, for example, a HALT instruction. Then, the processor waits in the stop condition for a restart.

However, in such a microprogram control system there is significant danger that the system may enter an indefinite state and runaway, that is, not arrive at the HALT instruction. This can occur due to external factors and principally occurs due to an instability in the power source voltage level.

The problem can also arise if processing has been resumed too soon after a HALT. In a conventional microprogram control system of the prior art, a power-on-clear circuit is actuated at the time when power is applied to the system and the power-on-clear circuit causes the program counter, which selects the addresses of the program in memory, to set to an initial state, usually the first memory address. Moreover, other flag elements which are not generally operated in response to a microinstruction are also set to an initial state in response to the power-on-clear circuit signals. When the time is short between power off and power on conditions, the power-on-clear circuit may not return to the internal conditions which allow a proper signal which restarts the computer at the suitable initial address and conditions. As a result, the computer malfunctions and may achieve an indefinite condition or runaway so that a program is never completed as indicated by a HALT istruction.

What is needed is a microprogram control circuit which detects an indefinite condition in program performance and an absence of a HALT instruction, and automatically stops the computer processing and allows for automatic or externally actuated restarting at the proper conditions whereby the program is reinitialized.

SUMMARY OF THE INVENTION

Generally speaking, in accordance with the invention, a microprogram control circuit which automatically ends an indefinite or runaway condition is provided. A microprogram control circuit interrupts high speed clock signals inputted to a processor when a HALT instruction issues from the processor in order to end operation at completion of a program. The clock signal is provided only when a program is in process. Should a program continue beyond a preselected time period without a HALT instruction, a control circuit including a timer detects this condition and interrupts the clock signals to the processor. Either an external signal or an automatic internally generated signal allows the clock signal to again enter the processor, reset the registers and address counter, and restart the program.

In an alternative embodiment, abnormal operation causes the program to restart without interrupting the clock signals.

Accordingly, it is an object of this invention to provide an improved microprogram control circuit which detects an abnormal operation of a computer and terminates the computer operation.

Another object of this invention is to provide an improved microprogram control circuit which detects the runaway operation of a program and terminates operation and reinitiates operation at the start of the program.

A further object of this invention is to provide an improved microprogram control circuit for getting out of an indefinite state when microinstructions read from a program memory and executed in a processing unit runaway without end.

Still another object of this invention is to provide an improved microprogram control circuit which detects a runaway program and automatically directs the processor to a routine or address which corrects the runaway condition.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
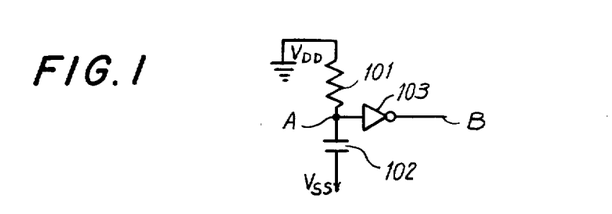
FIG. 1 is a power-on clear circuit as used in a computer.
Figure 2A:
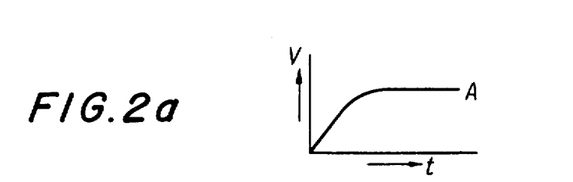
FIGS. 2a and 2b are timing charts associated with the circuit of FIG. 1.
Figure 2B:
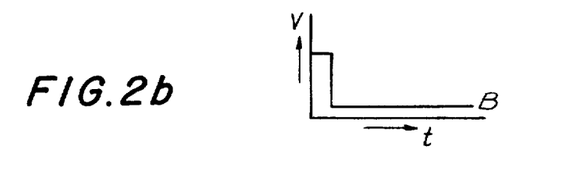

A conventional power-on-clear circuit shown in FIG. 1 is comprised of a resistor 101 in series with a capacitor 102 across a power source. An inverter 103 connects to the intersection between the resistor 101 and the capacitor 102. When the power supply is connected across the RC circuit, the capacitor 102 begins to charge at a rate determined by the size of the resistor 101 and the capacitor 102. The increase in voltage at point A between the resistor and capacitor is shown in FIG. 2a in relation to time t. The signal at point B which is high before the capacitor 102 begins to charge, is switched over to a low condition when the voltage at point A achieves a threshold value as illustrated in FIG. 2b where the ordinate is voltage and the abscissa is time t. Accordingly, there is a delayed signal at the output of the inverter 103 whenever power is applied to the circuit of FIG. 1. The voltage at point B remains constant so long as the power remains applied.

When the power is turned off, the voltage in the capacitor 102 is discharged and the voltage at points A and B, if sufficient time is available, return to the initial conditions indicated at zero time in FIGS. 2a,b. However, if the power is turned on again in the power-on-clear circuit of FIG. 1 before the electrical charge on the capacitor 102 is completely discharged, a signal as shown in FIG. 2b may not be outputted from the inverter 103. That is, the high portion of the signal never occurs while power is off. In such a case, there is the possibility that the initial address of a program counter and an initial value for various flags in the processor, which should be preset when the power is turned on, are not set but are in an indefinite state causing a runaway condition in the program memory. A microprogram control circuit in accordance with this invention corrects such a condition. Moreover, such a microprogram control circuit is used not only for erroneous operation of a power-on-clear circuit but in computers of large size using dynamic circuits. However, it is also possible that a dynamic circuit goes into an indefinite state due to fluctuations in the supply voltage and runs away because data is held by the parasitic capacity of the dynamic circuit.

In the microprogram control circuit in accordance with this invention, the processor system is considered to be running away when the processor system continues to operate for more than a preselected constant time. When such a condition occurs, an operating clock required for operation of the processor is inhibited from the processor circuits. This terminates the runaway program. Then, a trigger signal which is generated by an internal timer or applied by operation of an external control, is applied, and in response thereto the operating clock again supplies its signals to the processor unit. As explained more fully hereinafter, the program is executed after the trigger signal is applied from a predetermined initialed address in the program memory. From this predetermined initial address, the program returns to its ordinary operational sequence. Normally, each program is completed with a HALT instruction and because the processor operates at high speed, each program is completed, that is, reaches the HALT instruction, in less than the predetermined time which initiates a stoppage through the microprogram control circuit in accordance with this invention.

Figure 3:
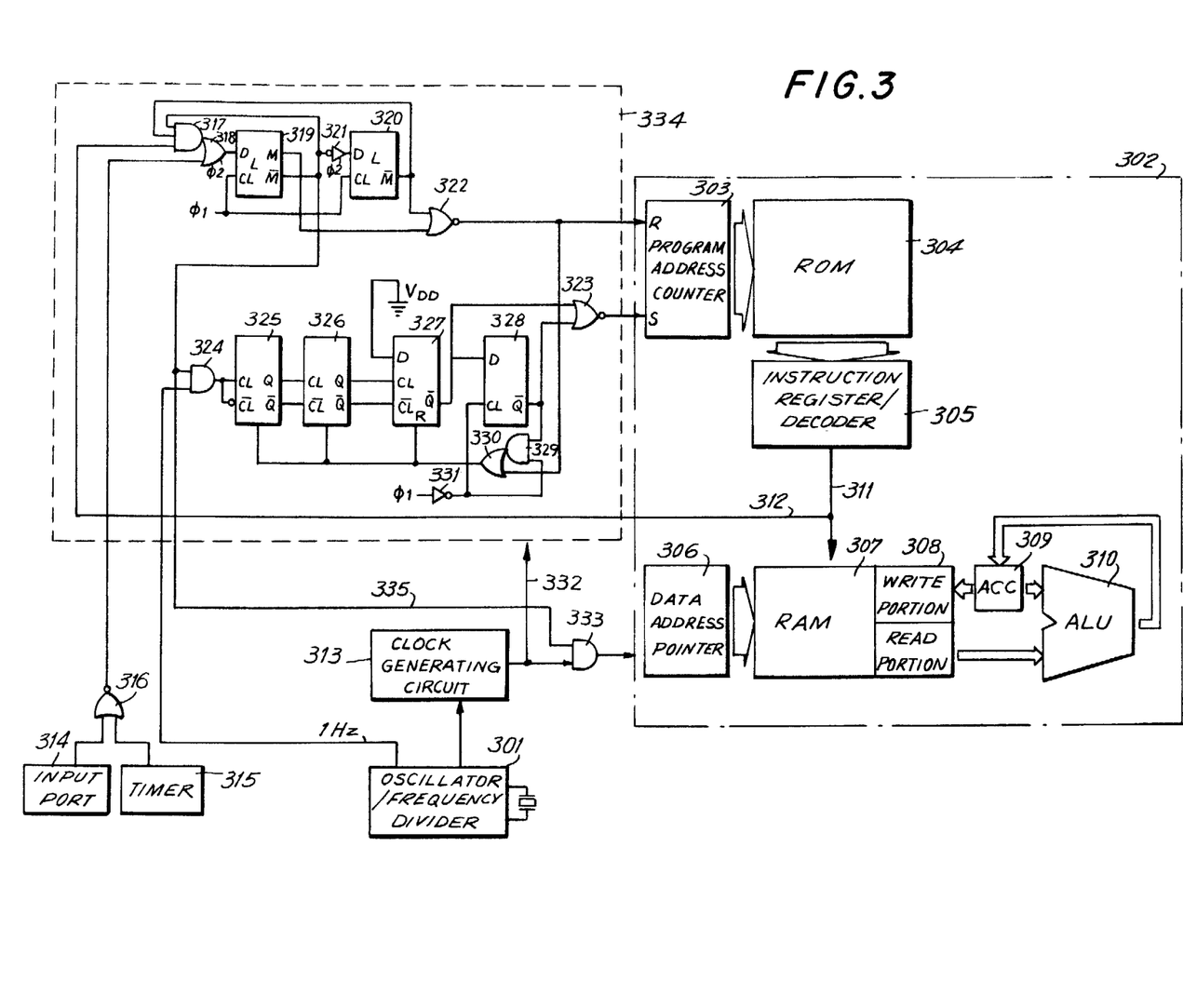
FIG. 3 is a semi-schematic diagram of a processor including a microprogram control circuit in accordance with this invention.

With reference to FIG. 3, a source 301 of different frequency signals includes an oscillator using a quartz crystal resonator and a divider network for dividing down the oscillator frequency to provide the differing frequency signal outputs. An operating clock generating circuit 313 receives an output from the frequency source 301 and outputs a clock signal to a main processing unit 302 when an intermediate AND gate 333 allows the signal to pass. The AND gate 333 passes the operating clock signal from the generating circuit 313 only when the signal on the line 335 is at a high or "1" level.

The main processing circuit 302 includes a program counter 303 which designates an address in a program memory 304. In this embodiment, for the sake of an example, the program memory 304 is a ROM (read-only memory).

Then, a microinstruction which is read from the program memory 304 at the designated address, is stored within an instruction register 305, and is read by means of a decoder in the known manner. The decoder outputs an instruction to other components of the processor system through an instruction bus 311. The main processor 302 further includes a data memory 307, which for the sake of example, is shown as a RAM (random access memory). A data pointer 306 designates an address in the RAM and an input-output circuit 308 of the RAM is used to read data in or out of memory in accordance with instructions from the decoder 305. Also included in the main processor circuit 302 is an arithmetic/logic unit (ALU) 310 for performing operations such as addition and subtraction, inversion, bit revolution, etc., in the usual manner in association with an accumulator 309 which serves as a working register.

Figure 4:
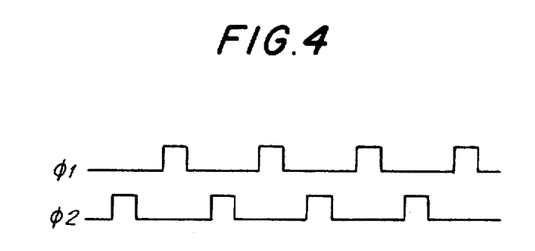
FIGS. 4 and 5 are waveform diagrams associated with the circuit of FIG. 3.

The main processor 302 performs its operations only when the clock signals are received from the AND gate 333. A microprogram control circuit 334 includes circuits for triggering and stopping the operations of the main processor circuit 302. This is accomplished by permitting or inhibiting the clock signals from the clock generator circuit 313 to pass the AND gate 333 to the main processor circuit 302. The circuit also includes a timer circuit 315 used for setting the address of the program memory 304 to the initial address of the program to be performed. This is done by acting on the program counter 303 which selects the desired addresses as described more fully hereinafter. Thus, the timer circuit 315, when operative, normally starts the program at its beginning. This occurs after operations of the main processor circuit 302 have been terminated by the control circuit 334. Also when the control circuit 334 detects that clock signals have been supplied continuously to the main processor circuit 302 beyond a preselected period of time, the address is reset. Clock signals ∅1 and ∅2 are supplied to the control circuit 334 from the clock generating circuit 313 through a bus 332. The waveforms of these signals are shown in FIG. 4. As previously stated, the signal on the line 335 is high when the main processor circuit 302 is operative, that is to say when the clock signal is supplied through the gate 333.

In normal operation a stopping instruction, that is, a HALT instruction is outputted from the ROM 304 through the instruction register/decoder 305 at the end of a program. This HALT instruction, which is a high, is carried on a line 312 and inputted to an AND gate 317 having three inputs. When the input on the line 312 goes high, the output at the AND gate 317 goes high and a high logic is written into a latch 319 through an OR gate 318 in response to the clock signal ∅1. As a result, the M output of the latch 319 goes low and the line 335 between the M output and the AND gate 333 is low. This low or "0" state prevents the signal from the clock generating circuit 313 from being supplied to the main processor circuit 302. Thus, operation of the main processor circuit 302 is stopped in normal operation.

When in the described condition where the clock is inhibited from being supplied to the main processor 302, a trigger signal is inputted from an internal timer 315 or through an external trigger signal input port 314. The trigger signal, regardless of whether it is received from the timer 315 or input port 314, is applied to an input of the OR gate 318 after passing through a NOR gate 316. This trigger causes the output of the OR gate 318 to go high and applies this high signal to the D terminal of the latch 319 causing the state at the outputs M, M̄ of the latch 319 to reverse. Thus, a high signal on the output $\overline{M}$ on the line 335 unlocks the gate 333 and the clock signal from the clock generating circuit 313 passes through the gate 333 to the main processor circuit 302. Typically, the trigger pulse is provided by the timer 315 one second after cessation of processor operation.

Simultaneously, the program counter 303 designates the initial address in the memory 304 in response to a differential signal from the M terminal of the latch 319. The signal from the M terminal of the latch 319 is outputted from a NOR gate 322 having inputs which are the M output of the latch 319 and a signal delayed by a clocked gate 321 and a latch 320. All of the bits in the program counter 303 are reset and the initial or first address is designated in the program memory 304, that is, the "0" address. Then, the program stored in the ROM 304 is executed in correspondence with the input trigger from the internal timer 315 or the input port 314 respectively.

When in abnormal operation the main processor circuit 302 runs away because of an instability, for example, in the power source, the program in the ROM 304 continues to be executed and does not come to an end. That is, a HALT instruction on the line 312 is not generated. As a result, the signal line 335 continues to carry a high signal and the clock generating circuit 313 continues to deliver the clock signal through the AND gate 333 which keeps the main processor circuit 302 in operation.

Figure 5:
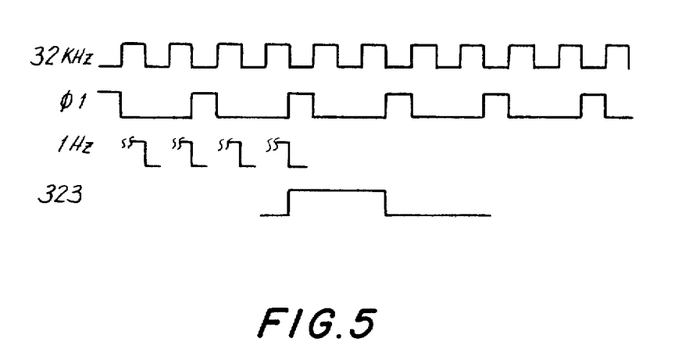

For the sake of example, the clock signal ⌀1 is a 16 khz signal being formed by the division of a 32 Khz signal, and a 1 hz signal is also provided from the oscillator/frequency divider 301. The 1 hz signal is counted four times by means of series flip-flops 325, 326. The 1 hz signals are inputted to the flip-flop 325 through an AND gate 324 having an input terminal connected to the line 335 which carries the pass/inhibit signals to the AND gate 333 as described above. Thus, only when the clock signals from gate 333 are inputted to the main processor circuit 302, the 1 Hz signals are inputted to the flip-flop 325. When four pulses of the 1 Hz signal have been counted by the flip-flops 325, 326 an input is made to the flip-flop 327. Then a signal synchronized with the clock signal ⌀₁ is obtained from a NOR gate 323 which responds to the $\overline{Q}$ outputs of flip-flops 327, 328 (FIG. 5). Because the programs performed by the main processor circuit 302 are less than four seconds in duration, any operation which continues for more than four seconds is regarded as "running away".

The output signal from the Nor gate 323 sets the program counter 303 to select a suitable address within the ROM program memory 304 whereat a program for determining the initial state of the circuit is stored. The initial state is created by a total clearance of the accumulator 309, flags, and so forth. Then, the flip-flops 325-327 are reset in response to a high signal outputted from a combination of gates 329-331 in response to a high in the clock signal ⌀1. In normal operation, when the programs in the main processor circuit 302 are executed in a time period less than four seconds, the flip-flops 325, 326 are reset in response to an output from the NOR gate 322 which is generated at the time that a trigger signal is inputted through the NOR gate 316 to start a program in the main processor circuit 302.

It should be understood that the above circuit description recites a timer comprising flip-flops 325, 326 set to output a signal in four seconds. However, the time value can be set to correspond to any time value which exceeds the period of time between initial triggering and execution of the system HALT instruction when the circuits are operating normally. As previously stated, the microprogram control circuit in accordance with this invention provides a convenient system for getting out of an indefinite or runaway state.

Figure 6:
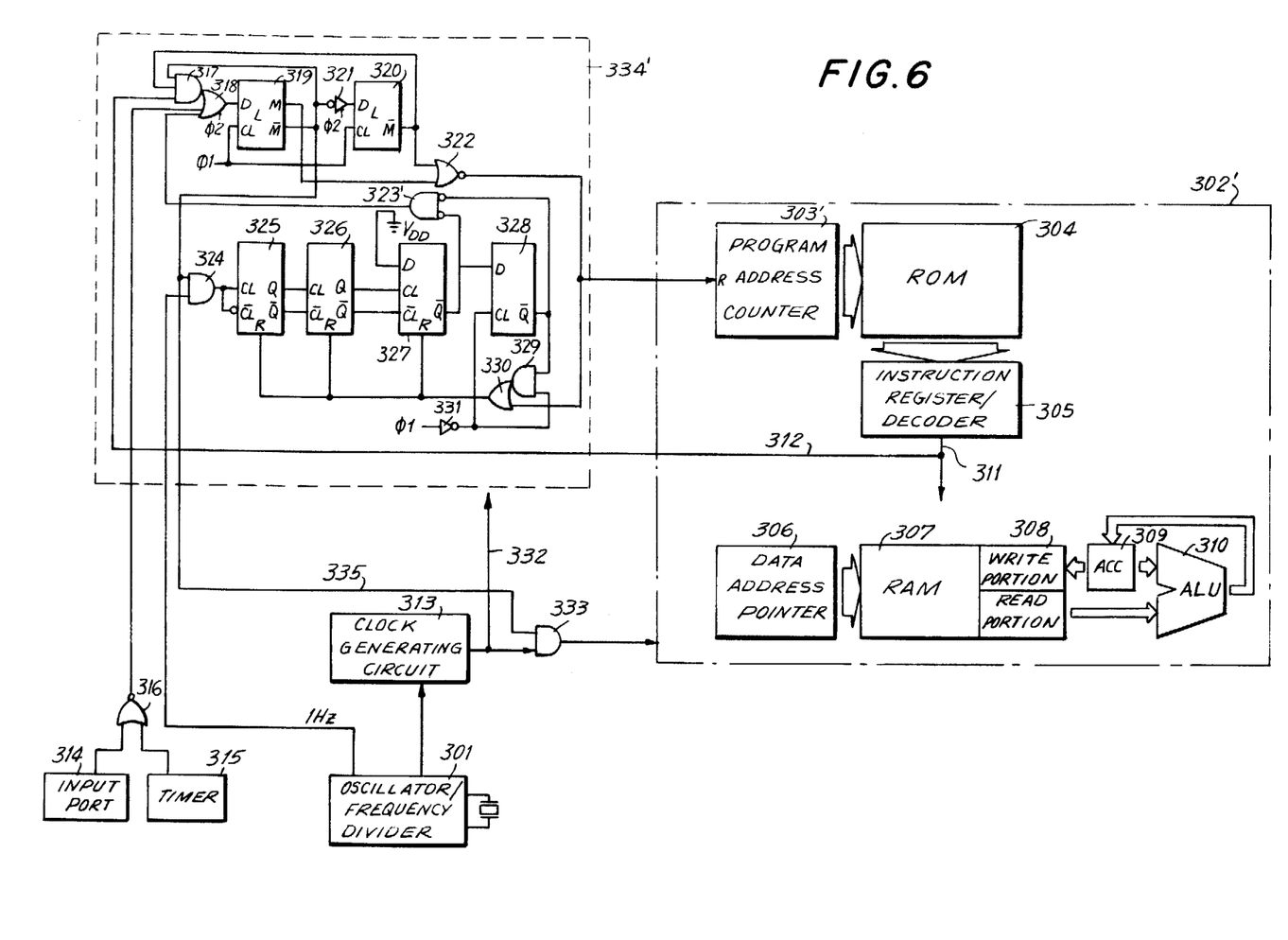
FIG. 6 is a diagram similar to FIG. 3 showing a processor including an alternative embodiment of a microprogram control circuit in accordance with this invention.

FIG. 6 shows a processor including an alternative embodiment of a microprogram control circuit in accordance with this invention. All components in FIG. 6 which are similar to components of FIG. 3 and perform similar functions have the same reference numeral in both Figures. Where differences exist between the Figures, a primed (') reference numeral is used in FIG. 6.

With reference to FIG. 6, a source 301 of different frequency signals includes an oscillator using a quartz crystal resonator and a divider network for dividing down the oscillator frequency to provide the differing frequency signal outputs. An operating clock generating circuit 313 receives an output from the frequency source 301 and outputs a clock signal to a main processing unit 302' when an intermediate AND gate 333 allows the signal to pass. The AND gate 333 passes the operating clock signal from the generating circuit 313 only when the signal on the line 335 is at a high or "1" level.

The main processing circuit 302' includes a program counter 303' which designates an address in a program memory 304. In this embodiment, for the sake of an example, the program memory 304 is a ROM (read-only memory).

Then, a microinstruction which is read from the program memory 304 at the designated address, is stored within an instruction register 305, and is read by means of a decoder in the known manner. The decoder outputs an instruction to other components of the processor system through an instruction bus 311. The main processor 302' further includes a data memory 307, which for the sake of example, is shown as a RAM (random access memory). A data pointer 306 designates an address in the RAM and an input-output circuit 308 of the RAM is used to read data in or out of memory in accordance with instructions from the decoder 305. Also included in the main processor circuit 302' is an arithmetic/logic unit (ALU) 310 for performing operations such as addition and substraction, inversion, bit revolution, etc., in the usual manner in association with an accumulator 309 which serves as a working register.

The main processor 302' performs its operations only when the clock signals are received from the AND gate 333. A microprogram control circuit 334' includes circuits for triggering and stopping the operations of the main processor circuit 302'. This is accomplished by permitting or inhibiting the clock signals from the clock generator circuit 313 to pass the AND gate 333 to the main processor circuit 302'. The circuit also includes a timer circuit 315 used for setting the address of the program memory 304 to the initial address of the program to be performed. This is done by acting on the program counter 303' which selects the desired addresses as described more fully hereinafter. Thus, the timer circuit 315, when operative, starts the program at its beginning. This occurs after operations of the main processor circuit 302' have been terminated by the control circuit 334' either when the control circuit 334' detects that clock signals have been supplied continuously to the main processor circuit 302' beyond a preselected period of time or after a HALT instruction. Clock signals ⌀1 and ⌀2 are supplied to the control circuit 334' from the clock generating circuit 313 through a bus 332. The waveforms of these signals are shown in FIG. 4. As previously stated, the signal on the line 335 is high when the main processor circuit 302' is operative, that is to say when the clock signal is supplied from the gate 333.

In normal operation a stopping instruction, that is, a HALT instruction is outputted from the ROM 304 through the instruction register/decoder 305 at the end of a program. This HALT instruction, which is a high, is carried on a line 312 and inputted to an AND gate 317 having three inputs. When the input on the line 312 goes high, the output at the AND gate 317 goes high and a high logic is written into a latch 319 through an OR gate 318' in response to the clock signal $\emptyset 1$. As a result, the $\overline{M}$ output of the latch 319 goes low ("0") and the line 335 between the $\overline{M}$ output and the AND gate 333 is low. This low or "0" state prevents the signal from the clock generating circuit 313 from being supplied to the main processor circuit 302'. Thus, operation of the main processor circuit 302' is stopped in normal operation.

When in the described condition where the clock is inhibited from being supplied to the main processor 302', a trigger signal is inputted from an internal timer 315 or through an external trigger signal input port 314. The trigger signal, regardless of whether it is received from the timer 315 or an input port 314, is applied to an input of the OR gate 318 after passing through a NOR gate 316. This trigger causes the output of the OR gate 318 to go high and applies this high signal to the D terminal of the latch 319 causing the state at the outputs M, $\overline{M}$ of the latch 319 to reverse. Thus, there is a high signal at the output $\overline{M}$ and the line 335 unlocks the gate 333, and the clock signal from the clock generating circuit 313 passes through the gate 333 to the main processor circuit 302'. Typically, the trigger pulse is provided by the timer 315 one second after cessation of processor operation.

Simultaneously, the program counter 303' designates the initial address in the memory 304 in response to a differential signal from the M terminal of the latch 319. The signal from the M terminal of the latch 319 is outputted from a NOR gate 322 having inputs which are the M output of the latch 319 and a signal delayed by a clocked gate 321 and a latch 320. All of the bits in the program counter 303' are reset and the initial or first address is designated in the program memory 304, that is, the "0" address. Then, the program stored in the ROM 304 is executed in correspondence with the input trigger from the internal timer 315 or the input port 314 respectively.

When in abnormal operation the main processor circuit 302' runs away because of an instability, for example, in the power source, the program in the ROM 304 continues to be executed and does not come to an end. That is, a HALT instruction on the line 312 is not generated. As a result, the signal line 335 continues to carry a high signal and the clock generating circuit 313 continues to deliver the clock signal through the AND gate 333 which keeps the main processor circuit 302' in operation.

Figure 7:
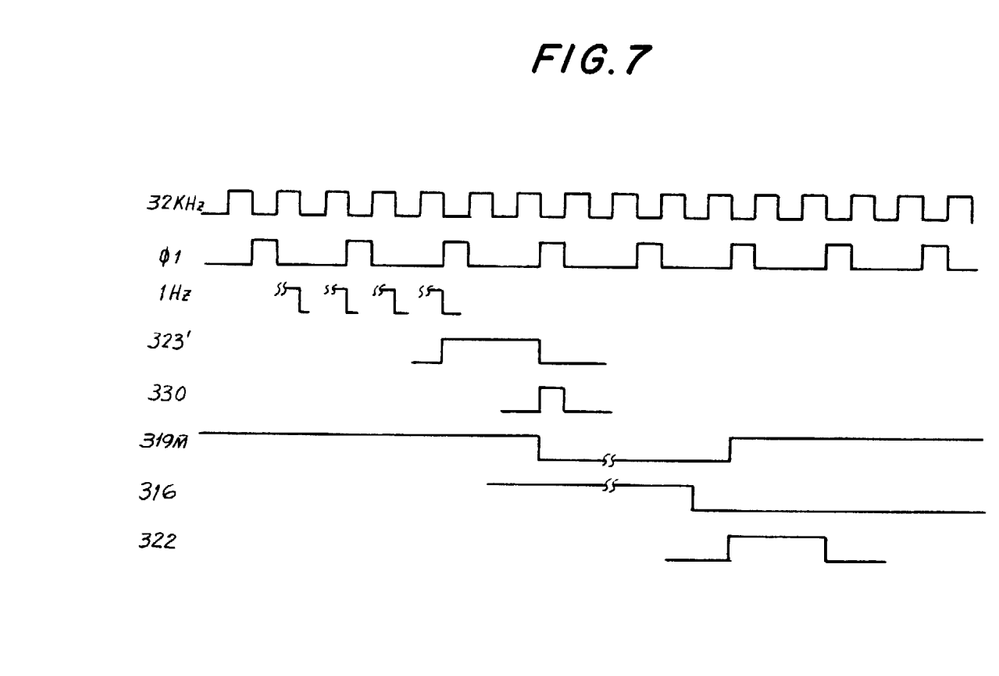
FIG. 7 is are timing waveforms associated with the circuit of FIG. 6.

For the sake of example, the clock signal $\emptyset 1$ is a 16 khz signal being formed by the division of a 32 Khz signal, and a 1 hz signal is also provided from the oscillator/frequency divider 301. The 1 hz signal is counted four times by means of series flip-flops 325, 326. The 1 hz signals are inputted to the flip-flop 325 through an AND gate 324 having an input terminal connected to the line 335 which carries the pass/inhibit signals to the AND gate 333 as described above. Thus, only when the clock signals from gate 333 are inputted to the main processor circuit 302, the 1 Hz signals are inputted to the flip-flop 325. When four pulses of the 1 Hz signal have been counted by the flip-flops 325, 326, an input is made to the flip-flop 327. Then a signal synchronized with the clock signal $\emptyset 1$ is obtained from an AND gate 323' having inverted inputs which responds to the $\overline{Q}$ outputs of flip-flops 327, 328 (FIG. 7). The $\overline{M}$ output of the latch 319 is driven to the low condition by the output from the gate 323, and the clock signal through the gate 333 is cut off from the main processor 302'. Because the programs performed by the main processor circuit 302' are less than four seconds in duration, any operation which continues for more than four seconds is regarded as "running away".

Then, the flip-flops 325-327 are reset in response to a high signal outputted from a combination of gates 329-331. This occurs also in response to an output from the NOR gate 322 which is generated at the time that a trigger signal is inputted through the NOR gate 316 to start a program in the main processor circuit 302'.

Figure 8:
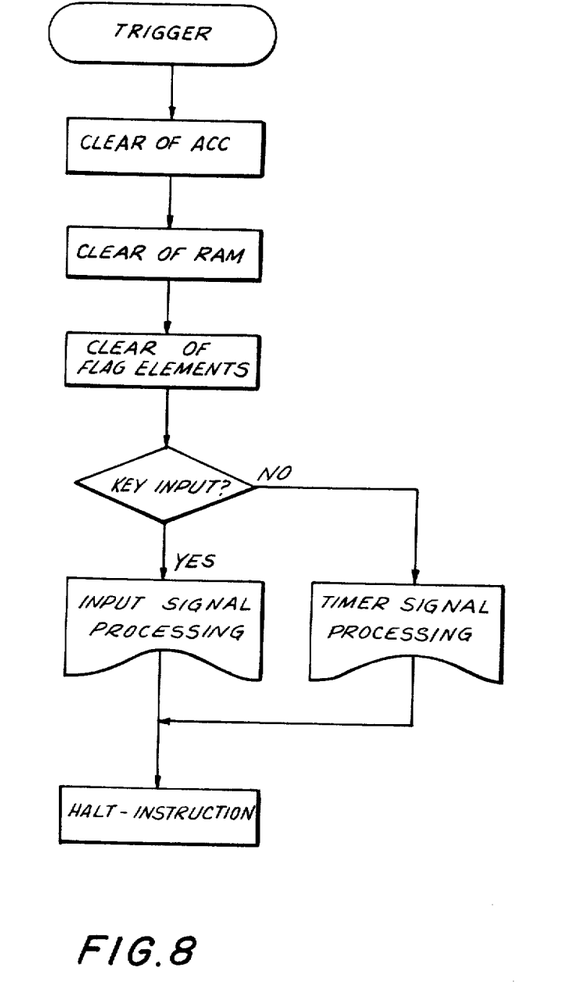
FIG. 8 is a flow chart associated with operation of the processor of FIG. 6.

After the clock signal through the gate 333 is stopped, either for a HALT instruction or for a runaway condition, the clock signal is resumed when a trigger signal is supplied to the NOR gate 316 from the input port 314 or the timer 315. This trigger signal makes the M output low at the latch 319 and allows the gate 333 to pass the clock signal to the main processor circuit 302'. A signal with a period of 1/16K is inputted to the NOR gate 322 and the program counter 303' is set to the "0" address. The processor then operates normally as shown in FIG. 8.

It should be understood that the above circuit description recites a timer comprising flip-flops 325, 326 set to output a signal in four seconds. However, the time value can be set to correspond to any time value which exceeds the period of time between initial triggering and execution of the system HALT instruction when the circuits are operating normally. As previously stated, the microprogram control circuit in accordance with this invention provides a convenient system for getting out of an indefinite or runaway state.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It also to be understood that the following claims are intended to cover all of the generic and specific features of the invention herein described and all statements of the scope of the invention which, as a matter of language, might be said to fall therebetween.

What is claimed is:

1. In a processor including a main processor comprising a memory circuit having a plurality of addresses for storing instructions therein, an address counter circuit for selecting the addresses in sequence to be read from said memory circuit, thereby providing instructions in sequence to said main processor to perform a program, said program including a program terminating instruction, and a source of clock signals, said clock signals being input at least to said main processor and being necessary to continue operation of said main processor circuits in performance of said instructions, the improvement therein comprising:

means for triggering performance of said program by setting said address counter circuit to an initial address of said program;

means for controlling the flow from said clock signal source to said main processor circuit of said clock signals, the occurrence of said program terminating instruction in said instruction sequence causing said means for controlling to inhibit flow of said clock signals whereby operations of said main processor on said instructions cease, said means for triggering causing said means for controlling said clock signals to initiate flow of said clock signals;

means for measuring the time of main processor operation from the start of performance of said program instructions, said means for measuring being adapted to cause said address counter circuit to select a designated address when said terminating instruction fails to occur in said sequence of instructions within a predetermined time period.

2. The processor as claimed in claim 1, wherein said designated address is to the initial instruction of said program.

3. The processor as claimed in claim 1, wherein said designated address provides instructions for a sub-program for determining the initial state of operation of said program.

4. In a processor including a main processor comprising a memory circuit having a plurality of addresses for storing instructions therein, and an address counter circuit for selecting the addresses in sequence to be read from said memory circuit, thereby providing instructions in sequence to said main processor to perform a program, said program including a program terminating instruction, and a source of clock signals, said clock signals being input at least to said main processor and being necessary to continue operation of said main processor circuits in performance of said instructions, the improvement therein comprising:

means for triggering the start of performance of said program by setting said address counter circuit to an initial address of said program;

means for controlling the flow from said clock signal source to said main processor circuit of said clock signals, the occurrence of said program terminating instruction in said instruction sequence causing said means for controlling to inhibit flow of said clock signals whereby operations of said main processor on said instructions cease, said means for triggering causing said means for controlling said clock signals to initiate flow of said clock signals;

means for measuring the time of main processor operation from the start of performance of said program instructions, said means for measuring being adapted to cause said means for controlling the flow of said clock signals to inhibit flow of said clock signals to said main processor when said terminating instruction fails to occur in said sequence within a predetermined time period.

5. The processor as claimed in claim 1, 2, 3 or 4, wherein said means for controlling the flow of clock signals includes a latch circuit and a gate, an output of said latch circuit being one input to said gate, said clock signals being a second input to said gate.

6. The processor as claimed in claim 5, wherein said gate is an AND gate.

7. A processor as claimed in claim 5, wherein said means for triggering is adapted to input a signal to said latch circuit.

8. The processor as claimed in claim 1, 2, 3, or 4, wherein said means for measuring includes a timer comprised of flip-flop stages in series, said timer stages being adapted for resetting upon occurrence of said program terminating instruction, said predetermined time exceeding the duration of said program of instructions.

9. The processor as claimed in claim 5, wherein said means for measuring includes a timer comprised of flip-flip stages in series, said timer stages being adapted for resetting upon occurrence of said program terminating instruction, said predetermined time exceeding the duration of said program of instructions.

10. The processor as claimed in claim 1 or 4, wherein said means for triggering includes an internal timer generating a signal following said terminating instruction.

11. The processor as claimed in claim 10, wherein said means for triggering further includes an input port adapted for inputting externally applied signals.

12. The processor as claimed in claim 1 or 4, wherein said means for triggering, when actuated, is adapted to cause said address counter circuit to be reset to an initial address in said sequence.

* * * * *